United States Patent [19]

Heinzl et al.

[11] 4,266,280
[45] May 5, 1981

[54] METHOD FOR STORING SERIAL DATA ON A RECORDING CARRIER

[75] Inventors: Joachim Heinzl, Munich; Hubert Schlossbauer, Krailling; Heide-Marie Miller; Irene Uhden, both of Munich, all of Fed. Rep. of Germany

[73] Assignee: Siemens Aktiengesellschaft, Berlin & Munich, Fed. Rep. of Germany

[21] Appl. No.: 24,437

[22] Filed: Mar. 27, 1979

[30] Foreign Application Priority Data

Apr. 4, 1978 [DE] Fed. Rep. of Germany ....... 2814569

[51] Int. Cl.$^3$ .......................... G06F 3/06; G11B 5/008
[52] U.S. Cl. ...................................... 364/900; 360/13
[58] Field of Search ... 364/200 MS File, 900 MS File; 360/13, 50, 55, 57; 371/30, 31, 37

[56] References Cited

U.S. PATENT DOCUMENTS

| | | | |
|---|---|---|---|
| 2,975,407 | 3/1961 | O'Brien | 360/50 |
| 3,185,966 | 5/1965 | Bennett et al. | 364/200 |
| 3,824,551 | 7/1974 | Arciprete et al. | 364/200 |
| 3,895,354 | 7/1975 | Kish | 364/900 |
| 3,918,090 | 11/1975 | Ludwig et al. | 360/72.1 |
| 3,930,234 | 12/1975 | Queisser et al. | 364/900 |
| 4,072,819 | 2/1978 | Lugwig et al. | |

Primary Examiner—Gareth D. Shaw
Assistant Examiner—Thomas M. Heckler
Attorney, Agent, or Firm—Hill, Van Santen, Steadman, Chiara & Simpson

[57] ABSTRACT

A method for storing serial data in blocks on a recording carrier allows editing of the stored data to be simply and quickly accomplished. A data block to be processed is stored in a working memory which is connected to an input/output unit and blocks immediately preceeding or succeeding the block to be processed are stored in intermediate memories connected to the working memory. Upon employment of the input/output unit data blocks are processed in the working memory and after reaching the highest address of the working memory the processed block is transmitted into a first intermediate memory and the succeeding block is transmitted from a second intermediate memory into the working memory.

7 Claims, 6 Drawing Figures

METHOD FOR STORING SERIAL DATA ON A RECORDING CARRIER

BACKGROUND OF THE INVENTION

1. Field of the Invention:

This invention relates to a method for storing serial data in the form of information blocks on a recording carrier, and for processing or editing same.

2. Description of the Prior Art:

Methods for correcting or editing text data stored on a recording carrier are known in the art. In accordance with such known methods, when later insertion of a data block between data blocks already stored on the recording carrier is desired, the block residing at the desired insertion location is read from the recording carrier and intermediately stored. Subsequently, the block to be inserted is recorded on the recording carrier at the position formerly occupied by the block now being intermediately stored. This process is repeated for all succeeding blocks which are individually read from the recording carrier, intermediately stored and again recorded on the recording carrier displaced by the length of the inserted block.

Processes such as that described above require a relatively long time span when a large number of data blocks are stored in the recording carrier at positions after the location at which a new block is to be inserted, because each block must be individually read from the recording carrier and be recorded displaced by the length of the inserted block. When several new blocks are to be inserted, the process must be frequently repeated.

SUMMARY OF THE INVENTION

In accordance with the principles of the present invention, a simple and quick method for editing texts stored in the form of serial data blocks on a recording carrier consists of storing a block to be processed in a working memory which is connected with an input/output unit. A data block preceeding or succeeding the location at which the new block is desired to be inserted is stored in a respectively first or second intermediate memory connected with the working memory and a write unit and a read unit. The blocks are processed upon employment of the input/output unit connected to the working memory, and after reaching the highest address of the working memory upon processing a block, this block is transmitted into the first intermediate memory and the succeeding block is transmitted from the second intermediate memory to the working memory.

In order to assure that the blocks each exhibit an equal block length, it is necessary upon removal of characters to replace removed characters with filler characters. Upon insertion of information characters in a data block, filler characters residing at corresponding memory locations of the working memory are replaced by information characters and the characters in the working memory are displaced starting at this location in such a manner that they are stored in the memory locations having the highest addresses and the filler characters are stored in the remaining memory locations.

Further, upon insertion of information characters when no filler characters are available in the working memory, the characters beginning at the memory location at which the information characters are to be inserted are transmitted to the second intermediate storage, to allow filler characters to be entered into the remaining memory locations in the working memory and in the second intermediate memory.

The correction of characters after an incorrect input can be accomplished in a simple manner when the respective address of the memory locations in the working memory is reduced corresponding to the number of characters to be corrected and filler characters are entered into the memory locations, which are subsequently replaced by the corrected information characters.

It is therefore an object of the present invention to provide a method for editing serial data stored on a recording carrier in the form of information blocks which can be simply accomplished in a relatively short time span.

Another object of the present invention is to provide a method for storing and editing serial data on a recording carrier so that incorrectly entered information characters can be corrected and additional material added without displacement of the already positioned blocks on the recording carrier.

DESCRIPTION OF THE PREFERRED EMBODIMENTS

Figure 1:
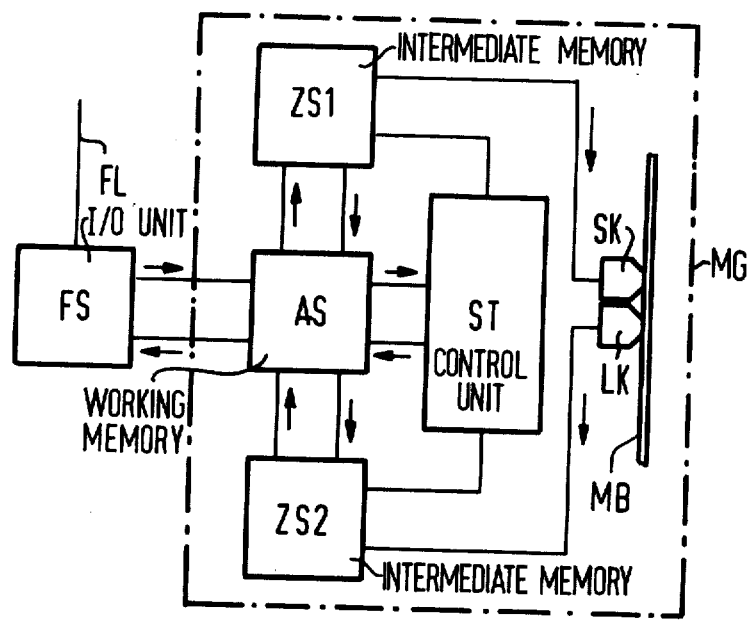
FIG. 1 is a block diagram showing the arrangement of components for implementation of the method of the present invention.

As illustrated in FIG. 1, a recording device MG has a read head LK and a write head SK for the processing of information on a recording carrier MB. The carrier MB may be a magnetic tape or other suitable recording means, and the recording device MG is provided with conventional means (not shown) for moving the carrier MB past the heads SK and LK.

The write head SK is connected to an intermediate memory ZS1 and the read head LK is connected to an intermediate memory ZS2. Both the intermediate memories ZS1 and ZS2 are connected to a control unit ST, as well as a working memory AS. The control unit ST is also connected to the working memory AS. An example of a control unit which can be utilized in the present invention is disclosed in U.S. Pat. No. 4,072,819 issued to Ludwig et al on Feb. 7, 1978, as set forth in FIGS. 3 through 7.

The working memory AS is connected to an input/output unit FS which in turn is connected to a long distance data line FL. The input/output unit FS may be a keyboard operated teletype as is known in the art, or any other conventional unit. If the output unit FS is a teletype, information is entered into the recording device MG by means of a perforated tape, and information is output from the recording device MG by means of a tape reader contained in the input/output unit.

To store data on the recording carrier MB, characters from the input/output unit FS are first entered into the working memory AS. With each information character, the control unit ST increases the address of the working memory AS, so that each succeeding character is respectively entered into the next highest memory location of the working memory AS. The number of memory locations in the working memory AS corresponds to the number of locations in a block on the carrier MB. When the highest address in the working memory AS has been reached, and thus a block in the working memory AS has been completely assembled, this block is transmitted into the intermediate memory ZS1 and is subsequently recorded by means of the write head SK onto the recording carrier MB.

Upon reading the recording carrier MB by means of the read head LK, each block from the carrier MB is first entered into the intermediate memory ZS2, and is transmitted from there into the working memory AS from which it is then delivered to the input/output unit character by character.

During this processing of data stored on the carrier MB, the information blocks are entered into the intermediate memory ZS2 in succession and, also in succession, transmitted into the working memory AS and are processed there insofar as required. Each block which is newly assembled is entered into the intermediate storage ZS1 from the working memory AS and is then again recorded onto the carrier MB by the write head SK.

Figure 2:
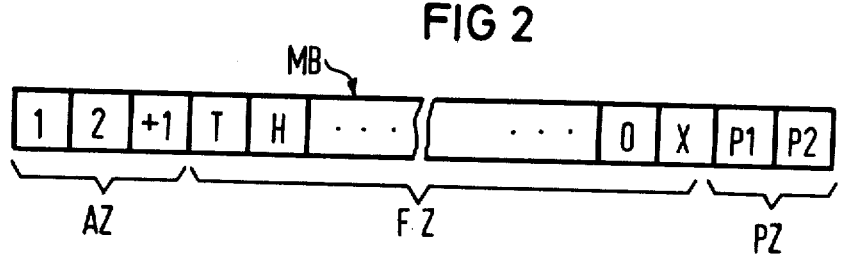
FIG. 2 is an enlarged diagrammatic view of a recording carrier with information stored thereon at designated locations.

As shown in FIG. 2, an information block on the carrier MB contains three address characters in the area designated by AZ, 125 locations at which information characters and filler characters allocated to the data can be stored, designated by the area FZ, and two test marks in the area PZ for block securing procedure.

The first address character in the AZ area, for example, may contain the character "1" which indicates that the block is located on track 1 of the carrier MB. The second address character in AZ, for example, "2", indicates that the next succeeding block is stored on track 2 of the carrier MB. The third address character in the area AZ, for example "+1", indicates that the next block is stored on track 2 of the carrier MB in the next possible block position in the forward direction.

The character in the 125 positions in the area designated by FZ may be stored, for example, in the form of teletype signals according to the CCITT code No. 2 having five bits each. A sixth bit may be added in order to distinguish whether the character is a numeral or a letter. After comparison of the current letter/numeral bits of a processed text, if necessary, corresponding characters presenting the letter/numeral nature of the character may be delivered for output to the input/output unit FS. Such characters are not, however, stored in the working memory AS. A seventh bit indicates whether the character is an information character or a filler character. Upon reading of the block out of the working memory AS, filler characters are not delivered to the input/output unit FS.

Only the address characters AZ and the information characters in the FZ area are stored in the intermediate memories ZS1 and ZS2 and in the working memory AS, so that each respectively requires a storage capacity of 128 characters. The control of the read in and read out of the processed text presented by the characters is accomplished by the control unit ST. The control unit ST contains an address control which indicates which storage location the next character to be processed is to be stored in the working memory AS. Upon reading of the blocks, the address indicates which information character is to be delivered next to the input/output unit FS, and the address is correspondingly increased by 1. When the address has reached the last location of the working memory AS and is further increased, then a change of block is triggered. The intermediate storage ZS1 is overwritten with the block from the working memory AS and the working memory AS is overwritten with the block from the intermediate memory ZS2. The address is then reset to the initial value, and the next block is read from the carrier MB into the intermediate memory ZS2.

Upon recording, the address characterizes the storage location into which the next information character which is delivered from the input/output unit FS must be placed, with a corresponding increase of 1 in the address count. A few positions before the highest address value, which may be varied according to anticipated need for space for subsequently entered data, the input of information characters is ended. The remaining area in the memory contains filler characters which can be later replaced by information characters. When the address exceeds the highest address of the working memory AS, a block change is again triggered. The block from the working memory AS is entered into the intermediate memory ZS1 and the address therein is set to the lowest value. The block now in the intermediate memory ZS1 may then be recorded on the carrier MB by the write head SK.

Removal of information from the carrier MB is accomplished by replacing information characters on the carrier MB by filler characters. The address for the location of the first removed information character is stored for subsequent insertion which may be necessary. A corresponding increase in address is counted. Upon exceeding the highest address of the working memory AS, all filler characters are displaced in such a manner so as to assume the highest addresses in the working memory AS. Then, as upon reading, a block change is triggered and the address is again set to the lowest value. After the block change, the block altered by means of the removal is now taken from the intermediate storage ZS1 and recorded on the carrier MB by the write head LK. The block which follows the block now in the working memory AS is read from the carrier MB into the intermediate memory ZS2.

Upon correction of information characters immediately after an incorrect input, the address indicates that location at which the information character is to be overwritten with a filler character, and is correspondingly counted down. When the address falls below the lowest value, then a resetting of the blocks is triggered. The intermediate memory ZS2 is overwritten with the block from the working memory AS and the working memory AS is overwritten with the block from the intermediate memory ZS1. The address is thereby set to the highest value. A resetting of the blocks is also triggered when the last line commencement is not located in the working memory AS, but rather is located in the intermediate memory ZS1. Beginning from this point, the non-erased line remainder must be output to the input/output unit FS.

Upon insertion of information characters after removal of previously stored information characters, the address is replaced by the stored address of the first removed character, so that an insertion occurs at that location. Upon insertion after the reading or after the correction of information characters, the storage location characterized by the address is checked. When it contains a filler character, an information character is inserted. When it contains no filler character, then the remainder of the working memory AS is occupied with information characters which are right-justified displaced beginning from this address. Filler characters are left-justified.

Figure 3A:
FIGS. 3a, 3b, and 3c are schematic representation of data stored in a working memory before and after processing in accordance with the disclosed method.
Figure 3B:
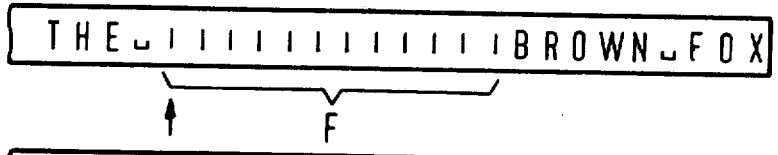
Figure 3C:
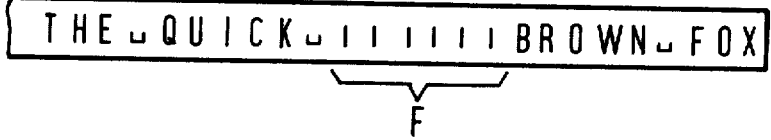

In the schematic illustrations of the contents of the working memory AS illustrated in FIGS. 3a, 3b and 3c, it is assumed that filler characters are arranged in the last storage locations designated by F. The text "THE BROWN FOX" is stored in the preceeding storage locations. The word "QUICK" is to be inserted at the location indicated by the arrow. As illustrated in FIG. 3b, the words "BROWN FOX" are first displaced right-justified, i.e., displaced to the storage locations with the highest addresses and the filler characters are moved to the left. Subsequently, the work "QUICK" is entered and five filler characters are replaced by the corresponding information characters comprising the word "QUICK".

When the number of filler characters is not sufficient to accommodate the desired insertion, the block containing the characters is divided. The content of the working memory AS is transferred from the corresponding location up to the highest address into the intermediate storage ZS2. Filler characters are inserted at the same locations in the working memory AS. Similarly, that part of the intermediate memory ZS2 which was not overwritten is filled up with filler characters. A new block is thus created in the intermediate memory ZS2. New information can now be inserted into the same address in the working memory AS, and it is counted up. If it exceeds the highest value, a block change occurs just as upon reading. The address is then reset to the initial value and the block is transferred by the intermediate memory ZS1 onto the carrier MB.

Figure 4:
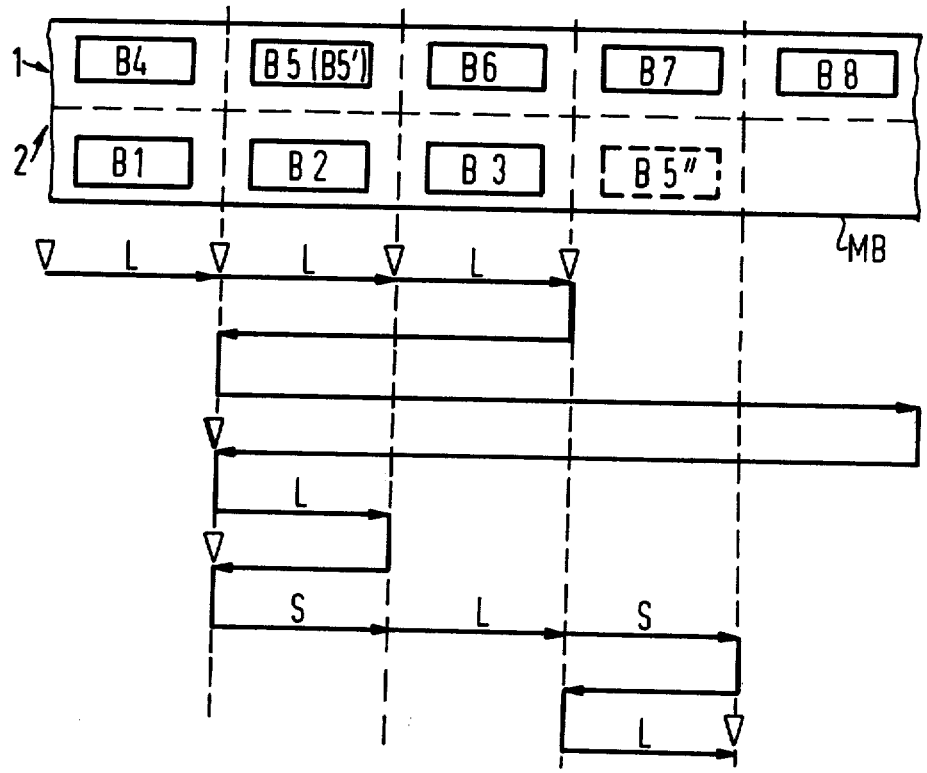
FIG. 4 shows the arrangement of information blocks on a recording carrier and the associated temporal movement of the carrier during processing in accordance with the disclosed method.

In the diagram of FIG. 4 it is assumed that first a reading of blocks, then an insertion, a correction, and another reading is carried out. The lower portion of the diagram of FIG. 4 is drawn as if the carrier MB were at rest and the write head SK and the read head LK were moving, however this is for exemplary purposes only and in actual operation it is the carrier MB which moves. The length and the direction of movement are characterized by the arrows, with triangles indicating positions at which movement is stopped. The text to be processed comprises five blocks B4, B5, B6, B7 and B8 positioned on track 1 of the carrier MB, and three supplementary blocks B1, B2 and B3 positioned on track 2 of the carrier MB. A further block B5" is generated during the processing. The reading begins with block B4.

The read head LK is positioned in front of block B4. The block B4 is read and entered into the intermediate memory ZS2. The carrier MB stops and information characters are transmitted from the intermediate memory ZS2 into the working memory AS and are delivered to the input/output unit from there. Subsequently, the block B5 is read and entered into the intermediate memory ZS2, with the carrier MB again stopping. When all information characters have been read out of the working memory AS, a block change is undertaken. The block B4 is entered into the intermediate memory ZS1, and the block B5 is entered into the working memory AS, and the block B6 is entered into the intermediate memory ZS2.

In the processing of the block B5, it is assumed that more information characters are to be inserted into the block than exist filler characters in the block B5. First, the processing of the block B5 in the working memory AS is begun. Beginning at that storage location at which the information characters are to be inserted, the information characters already existing in the block B5 are right-justified so that filler characters replace the information characters in those positions formerly occupied by the information characters. Upon insertion, the filler characters are replaced by information characters.

When no further filler characters are available, a block division is carried out. The remainder of the block is transferred to the intermediate memory ZS2 and the remaining locations in the working memory AS and the intermediate memory ZS2 are filled up with filler characters, and the insertion continues. It is now assumed that incorrect information characters were inserted, so that a correction is needed. The address of the working memory is reduced and the information characters which were just inserted are replaced by filler characters. Further, it is assumed that the beginning of the line to be corrected is stored in the intermediate memories ZS1. In this case, a back-spacing of the blocks ensues. The block B4 is stored in the intermediate memory ZS1 and is transmitted into the working memory AS, whereas the already processed block, designated as B5', is transmitted from the working memory AS into the intermediate memory ZS2.

During the processing of the block in the working memory AS, the carrier MB was moved to the left until the block B5 was beneath the heads SK and LK. A search run for an inscribable location on track 2 of the carrier MB is then undertaken in order to be able to record the newly created block B5" which arose upon the division of the block B5. After the blocks B2 and B3 on track 2, the carrier MB is moved in the forward direction until no further block is present in a length allocated to two blocks. Since no further blocks occur after the block B3, the number of the blocks run past, here two, is stored for the new address B5'. The carrier MB is subsequently again moved in the reverse direction until block B5 is again beneath the heads SK and LK.

The last line is again output to the input/output unit FS, and, when the highest address in the working memory AS has been reached, a block change is carried out. The block B4 is again stored in the intermediate memory ZS1, whereas the block B5' is transmitted from the intermediate memory ZS2 into the working memory AS. At the same time, the block B5 is read from the carrier MB and entered into the intermediate memory ZS2 and the same content as in block B5" is created here by means of the insertion of filler characters. The carrier MB is again reset so that the block B5 is beneath the heads. When the highest address in the working memory AS has been reached during the course of the insertion, a block change is again undertaken. The block B5' is entered into the intermediate memory ZS1, whereas the block B5" is transmitted into the working memory AS. Subsequently, the block B5' is stored on the carrier MB in place of the block B5. When all characters of the block B5" have also been read out of the working memory AS, the block B6 is read from the carrier MB and entered into the intermediate storage ZS2. After the transmission of all characters of the block B5" from the working memory AS to the input-/output unit FS, a block change is carried out. The block B5" is stored in the intermediate memory ZS1, while the block B6 is transmitted from the intermediate memory ZS2 to the working memory AS. Subsequently, the block B5" is recorded on track 2 on the carrier MB after the block B3. The carrier MB is then reset to move the block B7 beneath the heads, so that the information characters of the block B6 are delivered from the working memory AS to the input/output unit FS. The block B7 is then read from the carrier MB and entered into the intermediate memory ZS2.

Although various changes and modifications may be apparent to those skilled in the art, it is the intention of the inventors' to embody within the patent warranted hereon all such changes and modifications as reasonably and properly come within the scope of their contribution to the art.

We claim as our invention:

1. A method for processing characters serially stored on a recording carrier in the form of blocks of equal length, said characters consisting of binary-coded information characters and filler characters, comprising the steps of:
    transmitting a block to be processed from said recording carrier to a working memory;
    transmitting a block immediately preceding said block to be processed into a first intermediate memory connected to said working memory;
    transmitting a block succeeding said block to be processed into a second intermediate memory connected to said working memory;
    processing said block to be processed by changing the characters thereof my means of a user-operated input/output unit for inserting and removing characters connected to said working memory;
    transmitting said block to be processed into said first intermediate memory if a pre-determined number of characters is stored in said working memory;
    simultaneously transmitting said immediately preceding block from said first intermediate memory to said carrier;
    simultaneously transmitting said succeeding block from said second intermediate memory to said working memory;
    transmitting said block to be processed from said first intermediate memory to said carrier;
    simultaneously transmitting said succeeding block from said working memory to said first intermediate memory; and
    transmitting said succeeding block from said first intermediate memory to said carrier.

2. The method of claim 1 including the additional step of inserting said filler characters in place of any information characters which are removed from said block in said working memory during said processing.

3. The method of claim 1 wherein said block to be processed contains a further information character designating whether other characters in said block to be processed are of an alphabetical or numerical nature, said method including the additional step of bypassing said working memory with respect to such further information characters.

4. The method of claim 1 including the additional step of inserting information characters in place of filler characters occurring at corresponding storage locations in said working memory.

5. The method of claim 1 wherein said processing step is a step for inserting information characters into said block to be processed in said working memory at memory locations at which no filler characters are present, and is further defined by the steps of:
    displacing said information characters beginning at each of said memory locations to respective storage locations having highest memory addresses in said working memory, and
    storing filler characters at all remaining empty storage locations.

6. The method of claim 5 wherein no filler characters are available in the working memory, comprising the additional steps of undertaking a block division by:
    transmitting characters beginning at a storage location in said working memory at which characters are desired to be inserted into said second intermediate memory;
    entering filler characters into all remaining storage locations in said working memory and in second intermediate memory;
    creating an additional information block in said working memory comprised of newly-entered information characters and filler characters; and
    storing said additional information block on said carrier at a first open position.

7. The method of claim 1 wherein said processing step is a step for correcting an information block by inserting new information therein and is further defined by the steps of:
    reducing respective addresses of the storage locations in the working memory from a storage location presently-accessible by said input/output unit by an amount corresponding to the number of characters to be corrected to arrive at a newly-accessible storage location;
    entering filler characters in the storage locations between said presently- and newly-accessible locations; and
    replacing said filler characters by corrected characters.

* * * * *